No. 763,727.                                                        Patented June 28, 1904.

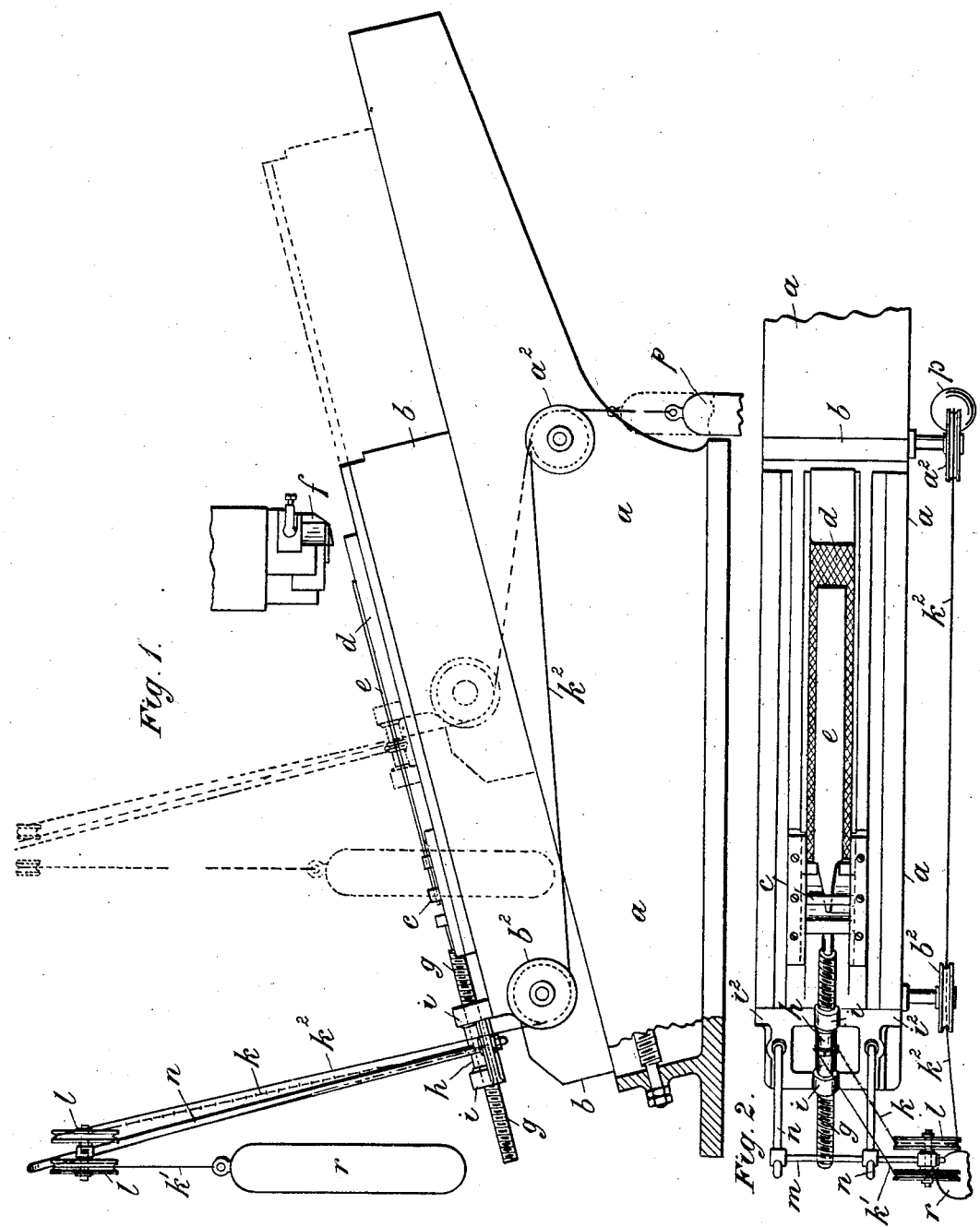

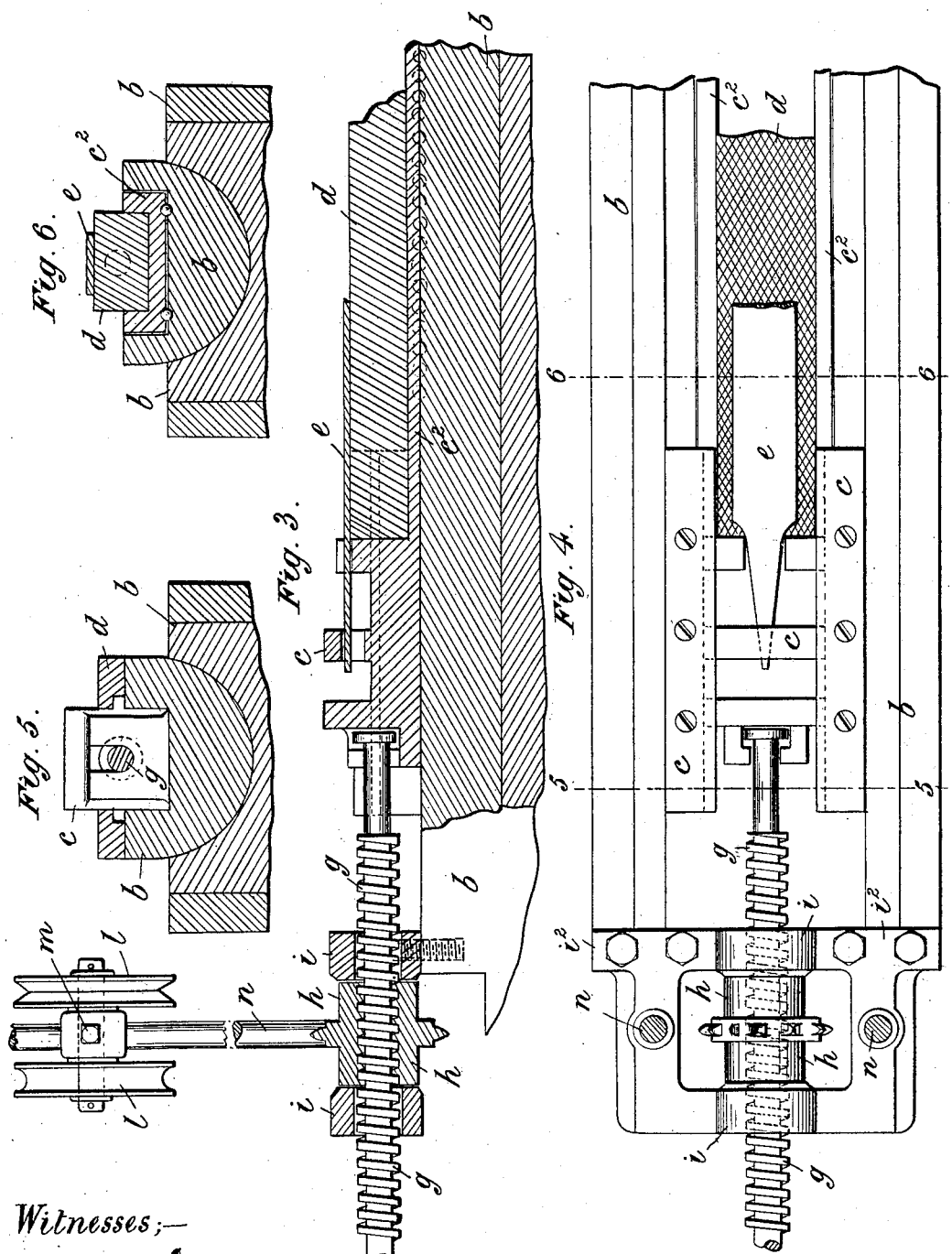

UNITED STATES PATENT OFFICE.

HENRY CRANE, JR., OF BIRMINGHAM, ENGLAND.

FILE OR RASP CUTTING MACHINE.

SPECIFICATION forming part of Letters Patent No. 763,727, dated June 28, 1904.

Application filed March 24, 1903. Serial No. 149,357. (No model.)

*To all whom it may concern:*

Be it known that I, HENRY CRANE, Jr., a subject of the King of Great Britain, residing at No. 183 Moseley street, Birmingham, England, have invented certain new and useful Improvements in File or Rasp Cutting Machines, of which the following is a specification.

My invention consists of the improvements in or additions hereinafter described to file or rasp cutting machines, by which improvements or additions the said file and rasp cutting machines are rendered very efficient and files and rasps are produced of a quality superior to those produced in ordinary file and rasp cutting machines.

I will describe my invention in connection with a file-cutting machine.

In order that my invention may be the better understood, I remark that in an ordinary file-cutting machine the file-blank to be operated upon is secured by a part technically called the "tang-holder" on the lead-cushioned inclined bed of the machine, which inclined bed has an intermittent or step-by-step feed motion given to it by pawl-and-ratchet or other mechanism. Each time a blow is struck by the tooth-cutting chisel of the machine a force is exerted on the file-blank tending to advance it up the inclined bed of the machine. As the file-blank is firmly fixed to the bed, which when the chisel descends is stationary, the chisel or cutting-tool (or its holder) is forced or jammed into such frictional contact with one side of its vertical guide that a considerable amount of the force of the blow, which would otherwise have had effect on the file-blank, is absorbed by the frictional resistance to the downward motion of the chisel referred to. Consequently the depression or cut in and tooth produced on the file-blank is less than it would have been had the chisel been free of the frictional resistance referred to. Further, the said frictional resistance to the descending motion of the chisel results in a gradual reducing of the space between adjacent teeth and a consequent crowding of the same, and this goes on until the chisel descending into the depression it last made results in a greater space being produced, which restores the average space between the teeth of a determined number to the uniform space which should have been obtained.

My invention has for its objects to obviate the frictional resistance to the downward motion of the chisel when producing each cut and the resulting crowding or unequal spacing of the teeth on the file, and these objects I effect by the construction and arrangement of parts hereinafter described, and represented in the accompanying drawings.

Figure 1 of the accompanying drawings represents in side elevation that portion of the frame of an ordinary file-cutting machine to which my improvements are applied. Fig. 2 is a plan of the same. Fig. 3 is a portion of the same in vertical section, drawn to a larger scale than Figs. 1 and 2, the said part being represented horizontal instead of inclined; and Fig. 4 is a plan of the part shown in Fig. 3. Figs. 5 and 6 are cross-sections taken, respectively, on the lines 5 5 and 6 6 of Fig. 4.

The same letters of reference indicate the same parts in the several figures of the drawings.

$a$ is the part of the frame of the machine on which the inclined intermittently-sliding bed $b$ works, as is usual, the intermittent sliding or feed motion being produced by the ordinary intermittent feed mechanism, which constitutes no part of my invention and is not represented.

Instead of firmly securing the tang-holder $c$ and lead cushion $d$ (on which latter the file-blank $e$ to be operated on is fixed) to the intermittent bed $b$, as is usual, I make the said tang-holder $c$ and lead cushion $d$ capable of a sliding motion on the bed $b$, so that when the chisel $f$ (shown in Fig. 1) strikes the blank $e$ to produce the depression or tooth the beveled face of the said chisel effects a slight upward sliding motion of the file-blank $e$, lead cushion $d$, and tang-holder $c$ on the inclined bed $b$. Consequently the acting end of the chisel $f$ descends into the file-blank $e$ to an extent due to the full or practically the full force applied to the same. In order to preserve the tang-holder $c$, cushion $d$, and file-bank $e$ thereon in the position on the bed $b$ to which they have been raised by the action of the chisel $f$, I provide on the bed $b$ stop mechanism consisting of a long screw $g$, one end of which engages loosely with the tang-holder $c$, as will be best understood by reference to Figs. 3, 4, and 5. The said screw $g$ passes through and is operated by an internally-screwed sleeve or screw-box $h$, which is arranged between two tubular but internally plain bosses $i\ i$ of the stop-carrying frame $i^2$, which is secured to the bed $b$. At the middle of the sleeve or screw-box $h$ are chain-wheel teeth. Passing under the chain-wheel teeth of the sleeve or screw-box $h$ is a long chain $k$, (indicated by a dot-and-dash line in Figs. 1 and 2,) the ends of which chain $k$ are connected to cords $k'\ k^2$, which pass over pulleys $l\ l$, the spindle of which is carried by a cross arm or rod $m$ at or near the top of a pair of props or uprights $n\ n$, projecting from the stop-frame $i^2$. The cord $k^2$ passes under a pulley $b^2$ on the intermittent bed $b$ and over a pulley $a^2$ on the stationary frame $a$ and has secured to its end a weight $p$. The other cord $k'$ has suspended from its end a heavier weight $r$.

From the description of the stop mechanism hereinbefore given it will be understood that when the file-blank $e$, lead cushion $d$, and tang-holder $c$ are moved up the intermittent bed $b$ by the action of the chisel $f$ on the file-blank $e$, the tang-holder $c$ being carried away from the end of the screw $g$, by which it was supported, the weight $r$ descends and through the cord $k'$, chain $k$, and cord $k^2$ gives a partial rotation to the sleeve $h$ in the direction proper for advancing the screw $g$ against the tang-holder $c$. Thus it will be understood that each time the file-blank $e$, lead cushion $d$, and tang-holder $c$ are moved on the intermittent bed $b$ the screw $g$ is immediately advanced against it, and consequently it is preserved in the position to which it has been raised by the action of the chisel $f$ on the blank $e$.

In Fig. 1 the intermittent bed $b$ and parts carried by it are represented in full lines in the positions which they occupy at the commencement of the operations on a file-blank, and the positions which the said parts occupy when the file-blank is finished are indicated in dotted lines in the said Fig. 1.

I wish it to be understood that I do not limit myself to the particular automatic stop mechanism hereinbefore described and represented, as various arrangements may be devised for that purpose.

In order to reduce friction to a minimum between the intermittent bed $b$ and the tang-holder $c$ when the latter partakes of its independent upward motion on the former, I prefer to make the tang-holder $c$ with a long base $c^2$, (see Figs. 3 and 6,) on which the lead cushion $d$ is placed, and to arrange ball or roller bearings between the long base $c^2$ of the tang-holder $c$ and the bed $b$, as is represented in Figs. 3 and 6.

The application of my invention to rasp-cutting machines differs in no respect from its application to a file-cutting machine hereinbefore described and represented, the cutting-tool alone being changed.

Having now described my invention, what I claim as new, and desire to secure by Letters Patent, is—

1. In a file or rasp cutting machine, a primary bed mounted for advancing movement, a secondary bed for the file or rasp blank, on said primary bed, the secondary bed being arranged to be positively advanced on the primary bed, solely by the impact force of the cutting-tool on the file or rasp blank.

2. In a file or rasp cutting machine, a primary bed capable of advancing movement, a secondary bed for the file or rasp blank, on said primary bed, the secondary bed being arranged to be positively advanced on the primary bed, solely by the impact force of the cutting-tool on the file or rasp blank, combined with means for retaining the secondary bed in its advanced position after the movement thereof.

3. In a file or rasp cutting machine, a bed, arranged for advancing movement, and a support for the file or rasp blank, on said bed, arranged to be positively advanced solely by the blow of a cutting-tool on the file or rasp blank, combined with a stop member loosely connected with said support, and mechanism for actuating said stop member as the file or rasp support is advanced, the stop member serving to prevent retractive movement of said support.

4. In a file or rasp cutting machine, a bed capable of advancing movement, and a support for the file or rasp blank, on said bed, arranged to be positively advanced solely by the blow of a cutting-tool on said blank, combined with a stop, and mechanism for actuating said stop into position to prevent retractive movement of said support.

5. In a file or rasp cutting machine, a bed capable of advancing movement, and a support for the file or rasp blank, on said bed, arranged to be positively advanced solely by the blow of a cutting-tool on said file or rasp blank, combined with a screw constituting a stop to prevent retractive movement of said support, and mechanism including a nut engaging the screw, for advancing the latter on the advance of the support.

In testimony whereof I have hereunto set my hand in presence of two subscribing witnesses.

HENRY CRANE, JUNR.

Witnesses:
RICHARD SKERRETT,
ARTHUR J. POWELL.